2,915,488
BENZOIC ACID-MODIFIED ALKYD RESINS AND THEIR PRODUCTION

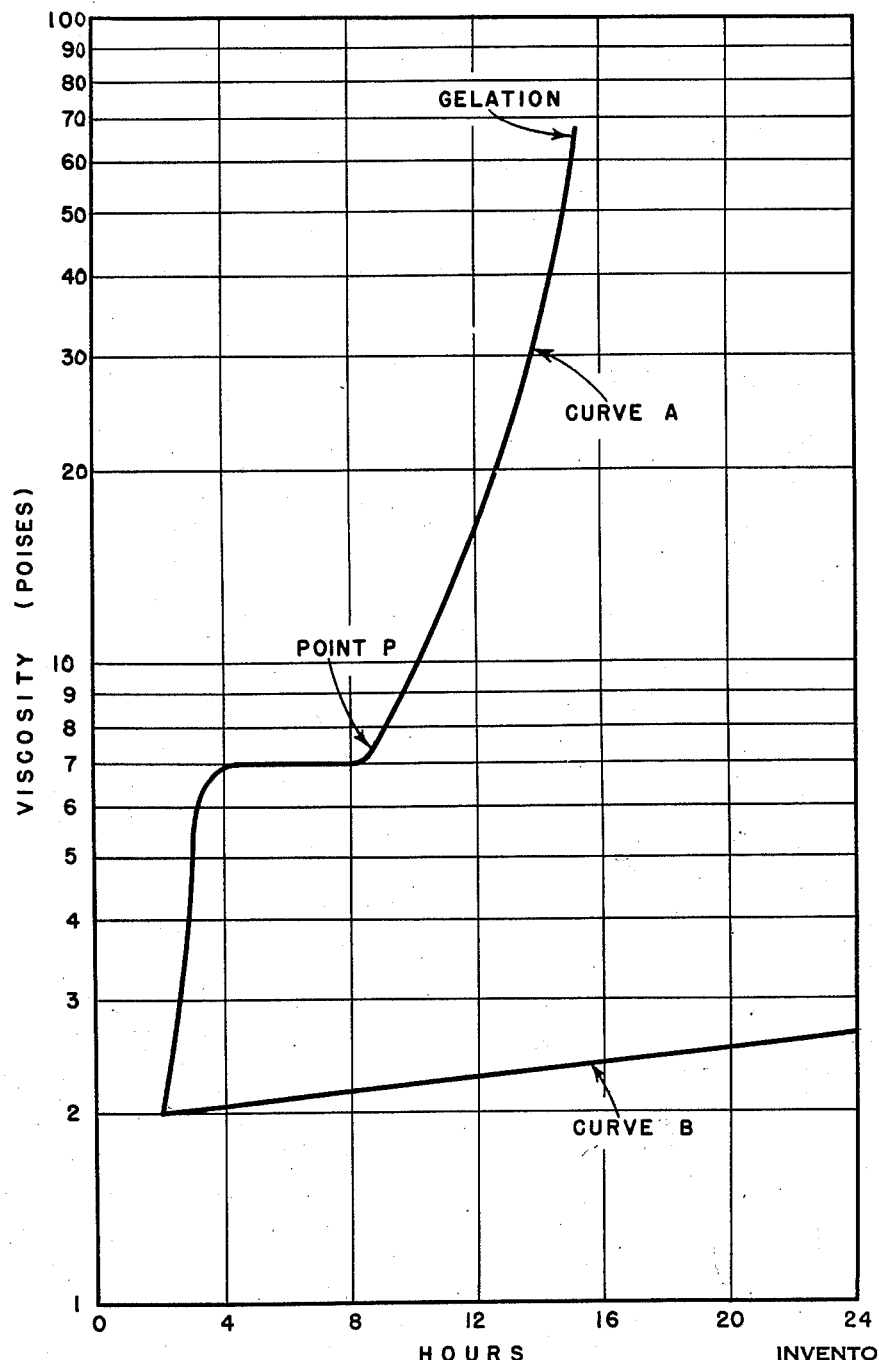

William M. Kraft, Verona, and Hyman M. Metz, Fair Lawn, N.J., assignors to Heyden Newport Chemical Corporation, a corporation of Delaware Application May 17, 1956, Serial No. 585,490

13 Claims. (Cl. 260—22)

The present invention relates to synthetic resins of the alkyd type and to the production of such resins. More particularly, this invention relates to novel modified alkyd resins having unusual properties and to their production.

Alkyd resins which are the resinous reaction products of a polyhydric alcohol and a polybasic acid have been modified with drying and semi-drying oils for use in coating compositions. Fatty acids, particularly the drying and semi-drying oil acids, also have been used to form oil modified alkyds having drying properties. These oil modified alkyds have received fairly wide commercial acceptance and large amounts are produced by forming the resinous reaction product of glycerol, drying oil acids and a dibasic acid such as phthalic acid or its anhydride. While such oil modified alkyds have properties which make them desirable for many purposes, these resins have a number of undesirable properties. Their resistance to alkali and detergents is low. In addition, films of these resins are too soft for many purposes. The hardness of these films may in some cases be improved by the addition of urea-formaldehyde resin. However, these resins have only limited compatibility and the addition of urea-formaldehyde reduces the flexibility of the films.

It has now been discovered that many advantages can be obtained by modifying certain polyhydric-fatty acid-polybasic acid alkyds by replacement of part of the fatty acid with benzoic acid. These alkyd resins while retaining many of the desirable properties of the oil modified alkyds are superior in many respects. The benzoic acid modified alkyds of the present invention have been found to possess remarkable resistance to alkali compared to ordinary modified alkyds; they body more rapidly to higher viscosities, and films containing them when dissolved in a solvent dry more rapidly and the resulting dried films are harder.

A type of alkyd resin embodying the principles of the present invention is the benzoic acid modified resinous reaction product of pentaerythritol, soy bean oil fatty acids and phthalic acids. However, the present invention is not limited to the use of pentaerythrithol only, since the polyhydric alcohol may be any alcohol selected from the group consisting of pentaerythritol, dipentaerythritol, tripentaerythritol, trimethylolethane, trimethylolpropane and mixtures thereof.

The term "fatty acid" is generic to those acids occurring in nature, usually in combination with glycerol. These acids are aliphatic monobasic acids, containing one carboxyl group with most of the acids containing 12 to 18 carbon atoms. The mixed fatty acids from soy bean, safflower, tall oil, linseed or dehydrated castor oil may be used as well as one or more of such acids as lauric, palmitic, stearic, oleic, linoleic, linolenic and the like. While both the saturated and unsaturated fatty acids may be used, it has been found that for a given set of conditions the rate of bodying increases as the unsaturation of the fatty acid increases and vice versa. Alkyds prepared from the mixed acids of a siccative oil, for example, soy bean oil, body faster than oleic acid alkyds which body faster than stearic acid alkyds. Particularly where bodying is an important consideration, a fatty acid or a mixture of fatty acids is preferred having an average iodine value or number of 75, or higher. Obviously, an acid of lower iodine value or number may be used where bodying is not such an important consideration and this is particularly true in the present case where bodying is enhanced by the use of benzoic acid.

The mixed acids of various siccative vegetable and fish oils, for example, linseed oil and soy bean oil acids, are commercially available. These mixed acids at times contain small amounts of glycerol or a glyceride ester. It has been found that the presence of glycerol or its ester reduces the resistance of the alkyd to alkali and when such mixed fatty acids are used, they should not contain sufficient glycerol or its ester to materially reduce the alkali resistance of the alkyd. Preferably, and in order to achieve maximum benefit from the present invention, the alkyd resins should be substantially glycerine free, that is, not contain glycerine in an amount sufficient to noticeably reduce the alkali resistance of the alkyd.

The dibasic acid may be any of the saturated or unsaturated polycarboxylic acids used heretofore, in the production of alkyd resins. While the preferred acids are the phthalic, isophthalic and terephthalic acids and these acids will be discussed in more detail, the present invention is not limited to these dicarboxylic acids and, for example, maleic, fumaric, sebacic, succinic, adipic and the like may be used. It is to be understood that the anhydrides may be used and that they are the full equivalent. The term "dibasic acid" includes not only the dicarboxylic form but also the anhydride form.

The present alkyds which contain fatty acids and are modified by replacement of part of the fatty acid with benzoic acid are benzoic acid modified alkyds with the alkyds being in that group of resins commonly referred to as "oil modified" alkyds. Oil modified alkyds are those alkyds modified with an oil such as soy bean oil or linseed oil or modified with the acids of such oils. In order to avoid confusion and undue use of the word "modified," this term will be used herein to refer to modification of the alkyd with benzoic acid, it being understood that the alkyd is a polyhydric alcohol-fatty acid-polybasic acid alkyd instead of an alkyd produced by reacting only a polyhydric alcohol and a polybasic acid.

The benzoic acid replaces at least 20% of the fatty acid. Smaller amounts of benzoic acid do not noticeably improve the results. Much larger amounts of benzoic acid may be used. While both fatty acid and benzoic acid should be used to obtain resins having drying properties, a very high percentage of the fatty acid may be replaced. For example, 80%, or more, of the fatty acid may be replaced with benzoic acid, the upper limit being governed by the desired air drying properties. "Replacement" of the fatty acid means for present purposes that the percent of the fatty acid referred to has been replaced by an equivalent molal amount of benzoic acid. For instance, if the type of alkyd would normally contain one mole of fatty acid, then 20% replacement would require 0.2 mole of benzoic acid. From the above, it may be seen that the molar amount of benzoic acid constitutes from 20% to 80% of the total molar amount of the fatty acids and the benzoic acid.

While the exact mechanism of the reaction is not fully understood it is believed that the improved properties of the present alkyds result from a reaction between the benzoic acid and the fatty acid. As will be discussed later, the available data strongly indicate that the fatty acid cross links through its long carbon chain with the nucleus of the benzoic acid to form a carbon to carbon linkage. Apparently this reaction between the fatty acid and the benzoic acid is more rapid and proceeds to a greater extent for the unsaturated fatty acids than for the saturated fatty acids so that the alkyds containing unsaturated fatty acids such as the mixed acids from drying oils produce resins highly resistant to alkali. While some reaction apparently results between fatty acids such as lauric and stearic acids, and benzoic acid, the reaction proceeds more slowly and to a more limited extent so that the alkali resistance of the alkyd resin is less than when the unsaturated acids are used.

In describing the amounts of the materials reacted it is considered that all of the acids enter into the esterification reaction and that part of the polyhydric alcohol is completely esterified. This amount of alcohol, which is regarded as completely esterified, therefore constitutes the amount required for reaction with all of the acid. The polyhydric alcohol in excess of this quantity actually reacts, but for purposes of calculation is considered as not reacting and is referred to as "excess." Customarily some excess polyhydric alcohol is used in making alkyd resins and the amount of excess alcohol will vary depending upon the material used.

The amount of excess polyhydric alcohol may vary from 0–5% based on the stoichiometric amount of polyhydric alcohol though in most cases the excess will be in the range of 3–30%. Some excess alcohol is desirable to prevent premature gelation during resin formation.

The proportions of the various ingredients can vary over a wide range. The preferable or optimum proportion of polyhydric alcohol to dibasic acid will for example depend on many factors including the particular alcohol used, the particular dibasic acid used and the properties desired including the desired modification with fatty acid desired in the basic formulation. However, in general, the amounts of polyhydric alcohol and dibasic acid will be in the range of from 0.5 to 2.0 moles of dibasic acid per mole of polyhydric alcohol (total amount). This ratio will vary to a limited extent depending on the number of hydroxyl groups in the alcohol as well as the particular dibasic acid used. For pentaerythritol the optimum is about one mole of dibasic acid per mole of alcohol with the preferred range being about 0.75–1.2 moles of dibasic acid per mole of pentaerythritol and about 3.0–1.0 moles of monobasic acid per mole of pentaerythritol. For a lower alcohol such as trimethylolethane or trimethylolpropane, there is preferably used about 0.5–1.15 moles of dibasic acid and about 2–0.25 mole of monobasic acid per mole of the alcohol. When dipentaerythritol is the alcohol, then the amount of dibasic acid preferably is in the range of 0.5–1.5 moles per mole of alcohol and the amount of monobasic acid is in the range of about 0.5–2 moles per mole of dipentaerythritol. Preferably, when using tripentaerythritol, about 0.75–2 moles of dibasic acid are used per mole of this alcohol and about 6–2.5 moles of monobasic acid are used per mole of tripentaerythritol. In each instance, the total molal amount of monobasic acid is the total molal amounts of fatty acid and benzoic acid.

For purposes of illustration, let it be assumed that it is desired to produce an alkyd resin of the present invention from pentaerythritol, soy bean oil fatty acids, benzoic acid and phthalic anhydride and it is desired to calculate the relative amounts of these materials required. Before calculating these amounts certain decisions or assumptions must be made. Assume that the alkyd resin is to contain one mole of phthalic anhydride per mole of pentaerythritol and 10% pentaerythritol in excess of the stoichiometric amount of pentaerythritol required for complete esterification of all of the monobasic and dibasic acids. Also assume that equal molal amounts of soy bean oil fatty acids and benzoic acid are to be used. Then the relative amounts of the materials can be caluculated from the following equation.

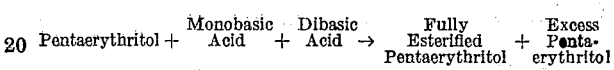

Under the previously stated conditions, each mole of pentaerythritol charged to the reaction will include 0.09 mole of excess pentaerythritol and 0.91 mole as the stoichiometric amount of pentaerythritol. For each mole of pentaerythritol there will be one mole of phthalic anhydride which will completely esterify 0.5 mole of pentaerythritol, leaving 0.41 (0.91 minus 0.5) mole of pentaerythritol to be esterified by the monobasic acids. As pentaerythritol contains four hydroxyl groups, the 0.41 mole of pentaerythritol will require 1.64 (4×0.41) mole of monobasic acid for complete esterification. With equal molal amounts of soy bean oil fatty acids and benzoic acid being used each mole of pentaerythritol charged will require 0.82 mole of soy bean oil fatty acids and 0.82 mole of benzoic acid. To sum up, the relative amounts of the materials required to make such an alkyd resin would be:

1 mole of pentaerythritol
1 mole of phthalic anhydride
0.82 mole of benzoic acid
0.82 mole of soy bean oil fatty acids The amount of alkyd resin is the total amount of fully esterified pentaerythritol plus the excess pentaerythritol which actually enters into the reaction and forms part of the alkyd resin. In the production of alkyds, the alcohol is mixed with the polybasic acid and heated to promote esterification of the alcohol with the splitting off of water. Additional heating effects polymerization to form the resin. Heating is desirable to promote the reactions involved with the higher temperatures increasing the rate of reaction and volatilizing the water as it is formed. The preferred temperature can vary over a wide range depending in part on the reactions and other factors normally recognized in the production of alkyd resins.

In producing the present alkyds, the fatty acid and benzoic acid are first heated and reacted together either before or concurrently with reaction with the polyhydric alcohol and/or the dibasic acid. For example, in the production of alkyd resin from pentaerythritol, soy bean fatty acids, benzoic acid and phthalic acid, the fatty acids and the benzoic acid can be heated at 260–270° C. for three hours, or a longer period at a lower temperature, before the pentaerythritol and phthalic acid are added and the reaction completed. The foregoing procedure is preferred although alternative procedures may be used. Good results can be obtained by heating together the fatty acid, benzoic acid and either pentaerythritol or phthalic acid before adding the necessary phthalic acid or pentaerythritol as the case may be. Alternatively, all of the ingredients may be mixed together and heated; for example, to 225–230° C. until the desired viscosity is reached. But neither the fatty acid nor the benzoic acid should be reacted individually with the alcohol; that is, if either is reacted with the alcohol, the other should be present. An alkyd prepared by reacting together the polyhydric alcohol, fatty acid and dibasic acid before adding the benzoic acid is definitely inferior and has lower viscosity and much lower alkali resistance as compared to an alkyd prepared by reacting the same materials according to any one of the previously described preferred procedures.

In the following examples all parts and percentages are by weight unless stated differently. The viscosity of the alkyd resins was determined after dissolving the alkyd in a solvent, usually xylene, to form a solution containing the stated percent by weight of resin. For example, the expression "60% in xylene" refers to the fact that the solution contained 60% resin and 40% xylene. Viscosity was determined in accordance with the Gardner Holdt procedure using a Gardner bubble viscometer. Briefly stated, this procedure involves placing the solution in a tube and determining the speed at which an air bubble travels up through the solution. The higher letters in the alphabet indicate the higher viscosities and vice-versa. This procedure is more fully described in various texts including "Stewart's Scientific Dictionary," 4th edition, published by Stewart Research Laboratory, Alexandria, Virginia.

Drying time was determined by casting onto a glass plate a film of the solution used for the viscosity determination suitably catalyzed by addition of driers and noting the time required to dry to the "set to touch condition" or to the "tack free condition." The hardness of the dried films was determined with a Sward hardness rocker and the results are expressed in terms of percentage of the hardness of glass, the latter being considered as 100%; for example, if 50 oscillations were required for glass and 13 oscillations were required by the dried film, then the hardness of the film is expressed as 26.

The Sward hardness rocker and its use are described in "Physical and Chemical Examination of Paints, Varnishes, Lacquers and Colors," H. A. Gardner and G. G. Sward, 10th edition, May 1946, distributed by Henry A. Gardner Laboratory, Inc.

The alkali resistance was determined by immersing the dried film cast on a one inch diameter test tube in a 3% aqueous solution of sodium hydroxide and the time noted when the first noticeable effect or attack appeared, and also when the film was completely destroyed. In all of the comparative examples, the tests were carried out under similar conditions and the results are comparable. However, in a few instances as noted, the solution of the alkyd was made up to contain a percentage of solids other than 60%. Obviously, a 70% solution will have a higher viscosity than a 60% solution and this is a factor in interpreting the results.

In the examples involving pentaerythritol the pentaerythritol used was a technical grade containing a small amount, about 8–10%, of dipentaerythritol and it had an average molecular weight of 145. The mixed fatty acids of soy bean oil had an iodine value of 124 and a minimum acid value of 196. Their average molecular weight was 280–283. These molecular weights were used in determining the proportions and the number of moles. In the examples, the expression "percent phthalic anhydride" is used in connection with the alkyd resins not modified with benzoic acid and refers to the percent of total resin forming reactants. While this expression has not been used in connection with the resins modified with benzoic acid, the percent phthalic anhydride can be readily calculated. The excess polyhydric alcohol is that amount in excess of the stoichiometric amount required for esterification of all of the acids and the percent excess is based on this stoichiometric amount required for esterification.

EXAMPLE 1

This comparative example illustrates the unusual viscosity and bodying properties of the present benzoic acid modified alkyds. Unlike the similar but unmodified alkyd resins which body slowly and at a uniform rate over a long period of time, the present benzoic acid modified alkyds body at a different rate. More particularly, the present alkyds undergo near the start of the reaction a rapid bodying with considerable increase in their viscosity. Thereafter, the rate of bodying decreases sharply for a period and this intermediate period is followed by a final period during which the viscosity increases rapidly to the point of gelation. The difference is shown in the attached drawing in which the viscosity is plotted against the heating time in hours. Curve B shows the bodying rate for a 22% phthalic anhydride alkyd and curve A is for a similar alkyd modified by replacement of 35% of the fatty acid with benzoic acid. These two alkyds were prepared from the following materials heated to the same temperature:

|  | Benzoic Acid Modified Alkyd | Unmodified Alkyd |
| --- | --- | --- |
| Pentaerythritol (22% excess) | 60.5 g. (0.409 mole) | 60.5 g. |
| Soy bean acids | 103.5 g. (0.368 mole) | 158.0 g. (0.558 mole). |
| Benzoic Acid | 23.9 g. (0.195 mole) | 0.0 g. |
| Phthalic Anhydride | 62.1 g. (0.42 mole) | 62.1 g. |

Under most conditions the improved properties, that is the exceptional alkali resistance and the high viscosity and rapid drying, are obtained when the benzoic acid modified alkyd has been heated past the point P on the drawing which is the point at which the bodying rate starts to rise sharply after the intermediate portion of the cycle. This provides a novel manner for easily controlling production of the alkyd resin. During the resinification cycle, samples may be periodically withdrawn and their viscosity readily determined. In this manner the point P can be determined and after it is reached, the alkyd can be cooled to obtain an alkyd resin having the desired properties. Under certain conditions the point P on curve A will be reached when the alkyd has a relatively high acid number while under other conditions it is necessary to heat the resin for a fairly long period after a low acid number has been reached in order to pass the point P and obtain a resin having the desired properties. The viscosity determination is, in general, a more accurate means of assuring the production of an alkyd having the desired properties.

That the viscosity of an alkyd resin can serve as an index to its other properties is shown in the following table listing the properties of these two alkyd resins. From the data in this table it is obvious that the benzoic acid modified alkyd resin which bodied more rapidly to a higher viscosity than did the unmodified alkyd, is faster drying, harder and more resistant to alkali.

*Table*

|  | Benzoic Acid Modified Alkyd | Unmodified Alkyd |
| --- | --- | --- |
| Viscosity (60% in xylol) | Y–Z | G–H. |
| Drying Time: |  |  |
| set to touch | 35 min | 50 min. |
| tack free | 110 min | 190 min. |
| Sward Hardness (after 8 days) (Percent Glass). | 26 | 10. |
| Alkali Resistance (3% NaOH): |  |  |
| effected slightly | 3 hours | 16 min. |
| destroyed | Intact after 30 days. | 12.75 hours. |

EXAMPLE 2

Two benzoic acid modified alkyd resins were prepared in a similar manner except for the conditions under which the soy bean fatty acids and benzoic acid were initially reacted. The first resin was prepared by mixing 148.5 grams (.53 mole) of soy bean fatty acids and 65 grams (.53 mole) of benzoic acid and then heating these acids for 8 hours at 240° C. Thereafter, 105.5 grams (.73 mole) of technical pentaerythritol and 110 grams (.743 mole) of phthalic anhydride were added and the mixture heated at 225–230° C. for 5 hours. This resin contained about 15% excess pentaerythritol and the amount of phthalic anhydride was the same as would have been contained in a 22% phthalic anhydride alkyd not modified with benzoic acid. The amount of benzoic acid in this alkyd corresponds to a 50% replacement of the fatty acid.

and phthalic anhydride. This alkyd contained 10% excess pentaerythritol and 16% phthalic anhydride. Two modified alkyds were prepared in which 50% and 65%, respectively, of the soy bean oil fatty acids was replaced by benzoic acid. The same reaction procedures were used in preparing each of the resins. In each instance, all of the reactants were placed in a flask equipped with an agitator along with 25 grams of xylene which was used to form an azeotrope with the water formed during the reaction. The mixture was heated with agitation to the reflux temperature of 177° C. in 40 minutes and then the temperature was raised to 225° C. in the next 30 minutes. Heating was continued at 225–230° C. for about 7 hours. In each instance the alkyd resins were cooled and diluted with xylene to form a solution containing 60% resin. The following table shows the quantities of material used in preparing each alkyd resin and the properties of the respective resins prepared therefrom:

Table

|  | Unmodified Alkyd | Modified Alkyd 50% | Modified Alkyd 65% |
|---|---|---|---|
| Ingredients: |  |  |  |
| Pentaerythritol (10% excess) | 109.8 g. | 109.8 g. (0.78 mole). | 109.8 g. |
| Soy bean oil fatty acids | 403 g. (1.44 mole). | 201.5 g. (0.72 mole). | 141 g. (0.504 mole). |
| Phthalic anhydride | 97.1 g. | 97.1 g. (0.66 mole). | 97.1 g. |
| Benzoic Acid | 0 | 87.9 g. (0.72 mole). | 114 g. (0.936 mole). |
| Properties: |  |  |  |
| Viscosity | A–B | D | F. |
| Acid Number | 7.0 | 5.9 | 2.8. |
| Saponification No | 189 | 199 | 215. |
| Film properties (Driers added)— |  |  |  |
| Drying Time: |  |  |  |
| Set to touch | 15 hrs | 2.25 hrs | 1.5 hrs. |
| Tack free | 23 hrs | 3 hrs | 1.66 hrs. |
| Sward Hardness (Percent Glass)— |  |  |  |
| Air dried 1 day | 4 | 6 | 8. |
| Baked film | 10 | 18 | 30. |
| Alkali Resistance (3% NaOH)— |  |  |  |
| Air dried: |  |  |  |
| Considerably affected | 10 min | 3.75 hrs | 15.5 hrs. |
| Destroyed | 6.5 hrs | 21 hrs | 388 hrs. |
| Baked Film: |  |  |  |
| Considerably affected | 1.5 hrs | 15.5 hrs | 124 hrs. |
| Destroyed | 11 hrs | 388 hrs | 388 hrs. |

A second resin was prepared using the same quantities of materials and in the same manner except that the soy bean fatty acids and benzoic acid were initially heated at 270–275° C. for 3 hours before the pentaerythritol and phthalic anhydride were added. These two resins had the following properties:

|  | First Resin | Second Resin |
|---|---|---|
| Viscosity (60% in xylene) | Z–3 | Z–6 |
| Film Properties (no driers): |  |  |
| Drying Time— |  |  |
| Set to touch min | 4 | 8 |
| Tack free do | 9 | 16 |
| Sward Hardness (Percent Glass): |  |  |
| Air dried film— |  |  |
| After 1 day | 26 | 24 |
| After 14 days | 50 | 50 |
| Baked Film | 54 | 54 |
| Alkali Resistance (3% NaOH): |  |  |
| Air dried film— |  |  |
| First attack hours | 1 | 3 |
| Destroyed do | 144 | 144 |
| Baked Film— |  |  |
| First attack do | 144 | 72 |
| Destroyed do | >300 | >300 |

EXAMPLE 3

An alkyd resin not modified with benzoic acid was prepared from pentaerythritol, soy bean oil fatty acids

EXAMPLE 4

Three alkyd resins were prepared and each alkyd resin contained 148.5 grams (.53 mole) of soy beam oil fatty acids, 65 grams (.53 mole) of benzoic acid, 105.5 grams (.73 mole) of technical pentaerythritol and 110 grams (.743 mole) of phthalic anyhdride. It is to be noted that this formulation corresponds to a pentaerythritol fatty acid-phthalic anhydride formulation containing 22% phthalic anhydride and about 15% excess pentaerythritol. In each instance, the reactants were all mixed at room temperature and the resulting mixture was then heated to 225–230° C. and held at this temperature for periods of 4.5 hours, 6.5 hours and 13 hours, respectively. This corresponded to heating the mixtures for ½ hour, 2½ hours and 9 hours, respectively, after the bodying had reached the point corresponding to point P on curve A of the drawing. The properties of these three benzoic acid modified resins are set forth in the following table. It is to be noted that the viscosity, alkali resistance and hardness are better after prolonged heating. The alkyd resin heated for the longest period was so viscous, that its viscosity was determined with a solution containing 50% resin and 50% xylene, whereas, the viscosity was determined for the other two resins on a 60% solution in xylene.

| | | | |
|---|---|---|---|
| Total time at 225-230° C | 4.5 hrs | 6.5 hrs | 13 hrs. |
| Time after Point P | 0.5 hrs | 2.5 hrs | 9 hrs. |
| Viscosity | X (60% in xylene). | Z (60% in xylene). | Y-Z (50% in xylene). |
| Drying Time: | | | |
| Set to touch | 16 min | 10 min | 7 min. |
| Tack free | 36 min | 30 min | 14 min. |
| Alkali Resistance (3% NaOH): | | | |
| Considerable attack | 4 hours | 22 hrs | 120 hrs. |
| Destroyed | 552 hrs | 552 hrs | >552 hrs. |
| Sward Hardness (Percent Glass): | | | |
| After 1 day | 20 | 22 | 26. |

EXAMPLE 5

A series of alkyd resins were prepared under comparable conditions. This series included an unmodified alkyd resin containing 22% by weight of phthalic anhydride and about 15% excess pentaerythritol. Comparable resins were prepared in which 35%, 50%, 65% and 100% of the fatty acid was replaced with the corresponding molar amount of benzoic acid. Each resin was prepared by mixing all of the ingredients at room temperature and then gradually heating them with agitation to 225-230° C. Thereafter heating was continued at this temperature for about 7 hours and then each alkyd resin was cooled and dissolved in xylene to form a solution containing 60% resin. This solution was used in determining the viscosity. A small amount of driers was added to the solution before determining the film properties. The only exception was the resin in which all of the fatty acid was replaced with benzoic acid. This resin was incompatible with xylene and was a non-drying type of resin so that it was impossible to determine its properties in accordance with the present procedures. This fatty acid-free resin was prepared from 118 g. pentaerythritol, 125 g. phthalic anhydride and 141 g. benzoic acid. The amount of the various materials in each resin and its properties are set forth in the following table:

225-230° C. for 4.5 hours. The acid number at this point was 7.4. Thereafter the phthalic anhydride was added and the mixture was heated at 225-230° C. until its acid number was 8.

A second, similar alkyd resin was prepared in a similar manner except that no benzoic acid was used. The molal amount of fatty acids was the same as the total molal amount of fatty acids and benzoic acid in the first resin. The following table lists the amounts of the ingredients for each resin and its properties:

Table

| | Second Resin | First Resin |
|---|---|---|
| Formulation: | | |
| Pentaerythritol | 126.8 g. (0.874 mole). | 126.8 g. |
| Phthalic Anhydride | 139.5 g. (0.942 mole). | 139.5 g. |
| Soy Bean Fatty Acids | 290 g. (1.017 mole). | 189.9 g. (0.661 mole). |
| Benzoic Acid | 0 | 43 g. (0.356 mole). |
| Acid Number | 5.8 | 8.8. |
| Viscosity (60% in xylene) | W | Z6-Z7. |
| Saponification No | 188 | 214. |
| Film Properties (Driers Added): | | |
| Drying Time— | | |
| Set to touch | 57 min | 6 min. |
| Tack free | 195 min | 12 min. |
| Sward Hardness (Percent Glass): | | |
| Air Dried (1 day) | 8 | 8. |
| Baked film | 14 | 36. |
| Alkali Resistance (3% NaOH): | | |
| Air dried film— | | |
| Considerable attack | 75 min | 105 min. |
| Destroyed | 12.75 hrs | 82 hrs. |
| Baked film— | | |
| Considerable attack | 27.6 hrs | 27.6 hrs. |
| Destroyed | 32 hrs | Intact after 700 hrs. |

EXAMPLE 7

A series of trimethylolethane-soy bean oil fatty acids-phthalic anhydride alkyd resins were prepared containing 26%, 32% and 35% phthalic anhydride. A series of comparable alkyds were prepared in which various amounts of the soy bean oil fatty acids were replaced with benzoic acid. These alkyds were all prepared under similar conditions by mixing the reactants at room temperature and then heating the mixture until the desired upturn in the viscosity curve occurred at point P. The Table

| | | | | |
|---|---|---|---|---|
| Formulation: | | | | |
| Percent Benzoic Replacement | 0 | 35 | 50 | 65. |
| Pentaerythritol (0.814 mole) | 118 g | 118 g | 118 g | 118 g. |
| Phthalic Anhydride (0.845 mole) | 125 g | 125 g | 125 g | 125 g. |
| Soy bean Fatty Acids | 328.8 g. (1.154 moles). | 213 g. (0.75 mole). | 164.4 g. (0.577 mole). | 114.2 g. (0.404 mole). |
| Benzoic Acid | 0 | 49.5 g. (0.404 mole). | 70.4 g. (0.577 mole). | 91.8 g. (0.75 mole). |
| Viscosity | G-H | V-W | Z-1 | Z6-Z7. |
| Acid No | 6.1 | 6.8 | 7.0 | 8.0. |
| Film Properties: | | | | |
| Drying Time— | | | | |
| Set to touch | 51 min | 13 min | 9 min | 6 min. |
| Tack free | 190 min | 64 min | 17 min | 10 min. |
| Sward Hardness (Percent Glass): | | | | |
| Air dried (1 day) | 8 | 14 | 18 | 30. |
| Baked film | 36 | 62 | | 52. |
| Alkali Resistance (3% NaOH): | | | | |
| Air dried— | | | | |
| Considerable attack | 135 min | 195 min | 19 hrs | 82 hrs. |
| Destroyed | 13 hrs | 154 hrs | >13 weeks | >13 weeks. |
| Baked Film— | | | | |
| Considerable attack | 27.6 hrs | Unaffected after 700 hrs. | Unaffected after 700 hrs. | 106 hrs. |
| Destroyed | 30 hrs | do | do | Intact at 700 hrs. |

EXAMPLE 6

A benzoic acid modified pentaerythritol-soy bean oil fatty acids-phthalic anhydride resin was prepared in which 35% of the molal amount of monobasic acid was benzoic acid. The benzoic acid, soy bean fatty acids and pentaerythritol were heated together in xylene at ingredients of these various resins and their properties are listed in the following table:

temperature and heated at 230° C. until the desired upturn in the viscosity curve occurred, that is, until the

|  | Unmodified | 50% Replacement of Fatty Acid |
|---|---|---|
| Trimethylolethane | 114.5 grams (.950 mole) | 114.5 grams (.950 mole). |
| Phthalic Anhydride | 130 grams (.880 mole) | 130 grams (.880 mole). |
| Soy Bean Fatty Acids | 262 grams (.930 mole) | 131.0 grams (.465 mole). |
| Benzoic Acid | 0 | 56.8 grams (.465 mole). |
| Viscosity (Percent in xylene) | I at 70% | F at 60%. |
| Drying Time: |  |  |
| Set to touch | 1:38 | 0:04. |
| Tack Free | 4:53 | 0:39. |
| Sward Hardness (Percent Glass): |  |  |
| 1 Day | 4 | 6. |
| 28 Days | 20 | 44. |
| Alkali Resistance (in Hours): |  |  |
| 3% NaOH— |  |  |
| 1st Attack | 0.25 | 1. |
| Destroyed | 1 | 48. |
| 1% Detergent— |  |  |
| 1st Attack | 5 | 20. |
| Destroyed | 20 | 48. |

|  | Unmodified | 35% Replacement of Fatty Acids | 50% Replacement of Fatty Acids |
|---|---|---|---|
| Trimethylolethane | 125.5 grams (1.042 moles). | 125.5 grams. | 125.5 grams. |
| Phthalic Anhydride | 160 grams (1.080 moles). | 160 grams. | 160 grams. |
| Soy Fatty Acids | 222 grams (.788 mole). | 143.5 grams (.512 mole). | 111.0 grams (.394 mole). |
| Benzoic Acid | 0 | 33.7 grams (.276 mole). | 48.2 grams (.394 mole). |
| Viscosity (Percent in xylene) | I at 70% | X+ at 60% | Z-3+ at 60%. |
| Drying Time: |  |  |  |
| Set to touch | 0:04 | 0:03 | 0:03. |
| Tack Free | 0:17 | 0:06 | 0:06. |
| Sward Hardness (Percent Glass): |  |  |  |
| 1 Day | 6 | 8 | 8. |
| 28 Days | 32 | 56 | 58. |
| Alkali Resistance (Hrs.): |  |  |  |
| 3% NaOH— |  |  |  |
| 1st Attack | 0.5 | 20 | 20. |
| Destroyed | 48 | 168 | 300. |
| 1% Detergent— |  |  |  |
| 1st Attack | 10 | 20 | 20. |
| Destroyed | 116 | 150 | 288. |

|  | Unmodified | 35% Replacement of Fatty Acids | 50% Replacement of Fatty Acids |
|---|---|---|---|
| Trimethylolethane | 135 grams (1.12 moles). | 135 grams (1.12 moles). | 135 grams (1.12 moles). |
| Phthalic Anhydride | 175 grams (1.18 moles). | 175 grams (1.18 moles). | 175 grams (1.18 moles). |
| Soy Fatty Acids | 203 grams (.722 mole). | 132 grams (.469 mole). | 101.5 grams (.361 mole). |
| Benzoic Acid | 0 | 30.9 grams (.253 mole). | 43.7 grams (.361 mole). |
| Viscosity (Percent in xylene) | Z-6 at 70% solids | Z-4 at 60% | Z-6+ at 60%. |
| Drying Time: |  |  |  |
| Set to touch | 0:03 | 0:03 | 0:04. |
| Tack Free | 0:15 | 0:06 | 0:07. |
| Sward Hardness (Percent Glass): |  |  |  |
| 1 Day | 8 | 10 | 20. |
| 28 Days | 48 | 64 | 72. |
| Alkali Resistance (in hours): |  |  |  |
| 3% NaOH— |  |  |  |
| 1st Attack | 0.5 | 20 | 5. |
| Destroyed | 48 | 144 | 170. |
| 1% Detergent: |  |  |  |
| 1st Attack | 5 | 20 | 20. |
| Destroyed | 120 | 160 | 170. |

EXAMPLE 8

A modified alkyd resin was prepared from 105.5 grams (0.409 mole) of dipentaerythritol, 80 grams (0.54 mole) of phthalic anhydride, 162 grams (0.572 mole) soy bean oil fatty acids and 70 grams (0.572 mole) benzoic acid. In this formulation 50% of the monobasic acid is benzoic acid and there is about 10% excess polyhydric alcohol. The ingredients were mixed at room temperature and heated at 230° C. until the desired upturn in the viscosity curve occurred, that is, until the viscosity passed the point corresponding to point P in the drawing.

A second, similar but unmodified alkyd containing 18.5% phthalic anhydride was prepared for comparative purposes. The properties of these two resins are compared in the following table. It can be seen from the data that the benzoic acid modified alkyd is far superior to the unmodified alkyd in many respects.

Table

|  | Benzoic Acid Modified | No Benzoic Acid |
|---|---|---|
| Viscosity | X (60% in xylene). | Z-2 (70% in xylene). |
| Drying Time: |  |  |
| Set to touch | 7 min. | 9 min. |
| Tack free | 17 min. | 94 min. |
| Sward Hardness: |  |  |
| After 1 day | 8 | 6. |
| After 28 days | 58 | 48. |
| Alkali Resistance: |  |  |
| 3% NaOH— |  |  |
| First attack | 2 hrs. | 5 min. |
| Destroyed | 144 hrs. | 42 hrs. |
| 1% Detergent— |  |  |
| First attack | 10 hrs. | 18 hrs. |
| Destroyed | 116 hrs. | 52 hrs. |

EXAMPLE 9

While oleic acid is an unsaturated fatty acid, its degree of unsaturation is not high and this acid is not usually considered suitable for use in preparing air drying alkyds. However, oleic acid can be used as the fatty acid in preparing the present type of benzoic acid modified alkyds.

A pentaerythritol alkyd containings 22% phthalic anhydride was prepared containing oleic acid as the fatty acid. Two other alkyds were prepared in which 50% and 65%, respectively, of the oleic acid was replaced with benzoic acid. The properties of these three resins as well as their ingredients are set forth in the following table. The unmodified resin did not dry and its film properties could not be determined.

Table

|  | 0% Benzoic Acid | 50% Benzoic Acid | 65% Benzoic Acid |
|---|---|---|---|
| Pentaerythritol | 147.7 g. (1.018 moles). | 147.7 g. | 147.7 g. |
| Phthalic Anhydride | 154 g. (1.04 moles). | 154 g. | 154 g. |
| Oleic Acid | 415.8 g. (1.486 moles). | 207.9 g. (.743 moles). | 146.3 g. (.52 mole). |
| Benzoic Acid | 0 | 89.6 g. (.743 mole). | 116.9 g. (.965 mole). |
| Viscosity (60% in xylene) | D | Y | Z. |
| Drying Time: |  |  |  |
| Set to touch | Did | 4 min. | 3 min. |
| Tack free | Not | 16 min. | 10 min. |
| Sward Hardness: |  |  |  |
| After 21 Days | Dry | 38 | 50. |
| Alkali Resistance: |  |  |  |
| Considerable attack |  | 6.5 hrs. | 28.3 hrs. |
| Destroyed |  | 216 hrs. | 288 hrs. |

EXAMPLE 10

A series of benzoic acid modified alkyds were prepared by four different procedures. A series of lauric acid modified alkyds were prepared by the same procedures for comparative purposes. The same ingredients were used in the same amounts for the resins of the same series and were as follows with equivalent molal amounts of lauric and benzoic acids being used:

|  | Lauric Acid Modified | Benzoic Acid Modified |
|---|---|---|
| Pentaerythritol grams | 124.8 | 124.8 |
| Soy Bean Fatty Acids do | 178.8 | 178.8 |
| Phthalic Anhydride do | 132 | 132 |
| Lauric Acid do | 121.5 |  |
| Benzoic Acid do |  | 74.4 |

A resin of each series was prepared by each of the following four procedures:

PROCEDURE A

All ingredients were charged to the reaction vessel and the mixture heated to the reaction temperature of about 230° C.

PROCEDURE B

The pentaerythritol soy bean oil fatty acids and the modifying acid, either lauric or benzoic acid, were first heated and reacted at 270° C. Then the phthalic acid was added and the reaction was completed at 230° C.

PROCEDURE C

The soy bean oil fatty acids, the phthalic acid, and the modifying acid, lauric or benzoic acid, were first reacted at 270° C. for 10 hours and thereafter the pentaerythritol was added and the reaction completed.

PROCEDURE D

The soy bean oil fatty acids and modifying acid were heated at 230° C. for 7 hours and thereafter the phthalic anhydride and pentaerythritol were added and the reaction completed.

The following table gives the viscosity of the resins (60% in xylene) and the time in hours required to denude in 3% caustic for air dried films (0.05% Co and 0.5% Pb driers added) and films baked at 150° C. for one hour, no driers. The films were coatings on one inch test tubes and were tested by A.S.T.M. method D154–52T.

Table

| Procedure | Lauric Acid Modified | | | Benzoic Acid Modified | | |
|---|---|---|---|---|---|---|
|  | Vis. | Air Dried | Baked | Vis. | Air Dried | Baked |
| A | Z-2 | 14 | 90 | Z-4 | >330 | >330 |
| B | Z-4 | 9 | 161 | Z-5 | >330 | >330 |
| C | Z+ | 4 | 41 | Z-6 | 41 | 161 |
| D | W | 5.5 | 64 | Z-6 | 161 | >330 |

We claim:

1. An alkyd resin which is the resinous product of the esterification at a temperature of at least about 225° C. of a polyhydric alcohol selected from the group consisting of pentaerythritol, polypentaerythritol, trimethylolethane, trimethylolpropane and mixtures thereof with benzoic acid, fatty acids containing 12–18 carbon atoms, inclusive, and dicarboxylic acid selected from the group consisting of phthalic acids, saturated aliphatic dicarboxylic acids containing from 4 to 10 carbon atoms, fumaric acid, maleic acid, and the anhydrides of said dicarboxylic acids, the total molar amount of the benzoic acid and said fatty acids being in the range of 0.25 to 6 moles per mole of polyhydric alcohol, the molar amount of benzoic acid constituting from 20% to 80% of the total molar amount of said fatty acids and the benzoic acid, the amount of the dicarboxylic acid being in the range of 2 to 0.5 moles per mole of polyhydric alcohol, and the polyhydric alcohol being reacted in the presence of both the benzoic acid and said fatty acids.

2. An alkyd resin which is the resinous product of the esterification at a temperature of at least about 225° C. of pentaerythritol with benzoic acid, fatty acids containing 12–18 carbon atoms, inclusive, and dicarboxylic acid selected from the group consisting of phthalic acids, saturated aliphatic dicarboxylic acids containing from 4 to 10 carbon atoms, fumaric acid, maleic acid, and the anhydrides of said dicarboxylic acids, the total molar amount of the benzoic acid and said fatty acids being in the range of 1 to 3 moles per mole of pentaerythritol, the molar amount of benzoic acid constituting from 20% to 80% of the total molar amount of said fatty acids and the benzoic acid, the amount of the dicarboxylic acid being in the range of 1.2 to 0.75 moles per mole of pentaerythritol, and the pentaerythritol being reacted in the presence of both the benzoic acid and said fatty acids.

3. The alkyd resin of claim 2 wherein the acid anhydride is phthalic anhydride and the fatty acids are siccative oil fatty acids.

4. The alkyd resin of claim 2 wherein the acid anhydride is phthalic anhydride and the fatty acids are soybean oil fatty acids.

5. An alkyd resin which is the resinous product of the esterification at a temperature of at least about 225° C. of a polyhydric alcohol selected from the group consisting of pentaerythritol, polypentaerythritol, trimethylolethane, trimethylolpropane and mixtures thereof with the product of the condensation at a temperature of at least about 225° C. of benzoic acid and fatty acids containing 12 to 18 carbon atoms, inclusive, and a dicarboxylic acid selected from the group consisting of phthalic acids, saturated aliphatic dicarboxylic acids containing from 4 to 10 carbon atoms, fumaric acid, maleic acid, and the anhydrides of said dicarboxylic acids, the condensation product being prepared from a total molar amount of benzoic acid and said fatty acids in the range of 0.25 to 6 moles per mole of polyhydric alcohol, the molar amount of benzoic acid constituting from 20% to 80% of the total molar amount of said fatty acids and the benzoic acid, and the amount of dicarboxylic acid being in the range of 2 to 0.5 moles per mole of polyhydric alcohol.

6. The alkyd resin of claim 5 wherein the acid anhydride is phthalic anhydride.

7. The alkyd resin of claim 5 wherein the dicarboxylic acid is isophthalic acid.

8. The alkyd resin of claim 5 wherein the dicarboxylic acid is terephthalic acid.

9. The alkyd resin of claim 5 wherein the dicarboxylic acid is phthalic acid.

10. The process of producing alkyd resins comprising the steps of forming a mixture including a polyhydric alcohol selected from the group consisting of pentaerythritol, polypentaerythritol, trimethylolethane, trimethylolpropane and mixtures thereof, benzoic acid, fatty acids containing 12–18 carbon atoms, inclusive, and dicarboxylic acid selected from the group consisting of phthalic acids, saturated aliphatic dicarboxylic acids containing from 4 to 10 carbon atoms, fumaric acid, maleic acid, and the anhydrides of said dicarboxylic acids, the total molar amount of the benzoic acid and said fatty acids being in the range of 0.25 to 6 moles per mole of polyhydric alcohol, the molar amount of benzoic acid constituting from 20% to 80% of the total molar amount of said fatty acids and the benzoic acid, the amount of the dicarboxylic acid being in the range of 2 to 0.5 moles per mole of polyhydric alcohol, and heating the mixture at a temperature of at least about 225° C. to form an alkyd resin, the polyhydric alcohol being heated in the presence of both the benzoic acid and said fatty acids.

11. The process of producing alkyd resins comprising the steps of forming a mixture including pentaerythritol, benzoic acid, fatty acids containing 12–18 carbon atoms, inclusive, and phthalic anhydride, the total molar amount of the benzoic acid and said fatty acids being in the range of 1.0 to 3 moles per mole of pentaerythritol, the molar amount of benzoic acid constituting from 20% to 80% of the total molar amount of said fatty acids and the benzoic acid, the amount of phthalic anhydride being in the range of 1.2 to 0.75 moles per mole of pentaerythritol, and heating the mixture at a temperature of at least about 225° C. to form an alkyd resin, the pentaerythritol being heated in the presence of both the benzoic acid and said fatty acids.

12. The process of producing alkyd resins comprising the steps of heating at a temperature of at least about 225° C. benzoic acid with fatty acids containing from 12 to 18 carbon atoms, inclusive, to form a fatty acid-benzoic acid condensation product and thereafter heating at a temperature of at least about 225° C. to form an alkyd resin the fatty acid-benzoic acid condensation product with a polyhydric alcohol selected from the group consisting of pentaerythritol, polypentaerythritol, trimethylolethane, trimethylolpropane, and mixtures thereof and a dicarboxylic acid selected from the group consisting of phthalic acids, saturated aliphatic dicarboxylic acids containing from 4 to 10 carbon atoms, fumaric acid, maleic acid, and the anhydrides of said acids, the total molar amount of the benzoic acid and said fatty acids being in the range of 0.25 to 6 moles per mole of polyhydric alcohol, the molar amount of benzoic acid constituting from 20% to 80% of the total molar amount of said fatty acids and the benzoic acid, and the amount of the dicarboxylic acid being in the range of 2.0 to 0.5 moles per mole of the polyhydric alcohol.

13. The process of claim 12 wherein the polyhydric alcohol is pentaerythritol and the dicarboxylic acid is phthalic anhydride, the dicarboxylic acid being present in an amount of 0.75–1.2 moles per mole of pentaerythritol and the fatty acid being present in an amount of 3.0–1.0 moles per mole of pentaerythritol.

References Cited in the file of this patent

UNITED STATES PATENTS

| | | |
|---|---|---|
| 2,352,810 | Swain | July 4, 1944 |
| 2,606,161 | Marling | Aug. 5, 1952 |
| 2,627,508 | Lum | Feb. 3, 1953 |